E. J. VON PEIN.
TICKET ISSUING AND ACCOUNTING MACHINE.
APPLICATION FILED SEPT. 1, 1911.

1,186,626.

Patented June 13, 1916.
5 SHEETS—SHEET 1.

Fig. 1.

Witnesses
C. Klostermann
W. M. McCarthy

Inventor
Edward J. Von Pein
by R. C. Glass
Attorney

E. J. VON PEIN.
TICKET ISSUING AND ACCOUNTING MACHINE.
APPLICATION FILED SEPT. 1, 1911.

1,186,626.

Patented June 13, 1916.
5 SHEETS—SHEET 2.

Fig. 2.

Witnesses
C. Klostermann
A. Rummler

Inventor
Edward J. Von Pein
by R. C. Class
Attorney

E. J. VON PEIN.
TICKET ISSUING AND ACCOUNTING MACHINE.
APPLICATION FILED SEPT. 1, 1911.

1,186,626.

Patented June 13, 1916.
5 SHEETS—SHEET 3.

Fig. 3.

Witnesses
C. Klostermann
R. Cummler

Inventor
Edward J. Von Pein
by R C Sloss
Attorney

E. J. VON PEIN.
TICKET ISSUING AND ACCOUNTING MACHINE.
APPLICATION FILED SEPT. 1, 1911.

1,186,626.

Patented June 13, 1916.
5 SHEETS—SHEET 4.

Fig. 4.

Witnesses
C. Klostermann
F. Ammuler

Inventor
Edward J. Von Pein
by R. C. Glass
Attorney

UNITED STATES PATENT OFFICE.

EDWARD J. VON PEIN, OF DAYTON, OHIO, ASSIGNOR TO THE NATIONAL CASH REGISTER COMPANY, OF DAYTON, OHIO, A CORPORATION OF OHIO, (INCORPORATED IN 1906.)

TICKET ISSUING AND ACCOUNTING MACHINE.

1,186,626.                Specification of Letters Patent.    Patented June 13, 1916.

Application filed September 1, 1911.   Serial No. 647,164.

*To all whom it may concern:*

Be it known that I, EDWARD J. VON PEIN, a citizen of the United States, residing at Dayton, in the county of Montgomery and State of Ohio, have invented certain new and useful Improvements in Ticket Issuing and Accounting Machines, of which I declare the following to be a full, clear, and exact description.

This invention relates to ticket issuing and accounting machines.

Among the objects of the invention is to provide an accounting machine with a differentially operable motor and suitable devices for controlling the differential operation of the same.

Another object of the invention is to provide a motor driven accounting machine with keys having successive control of accounting differential mechanism and the motor circuit.

Another object of the invention is to provide an accounting machine wherein the manipulation of a single key results in a desired differential operation of a motor driven accounting device in contradistinction to motor driven devices requiring manipulative devices to effect a desired differential operation of the accounting devices.

With these and incidental objects in view the invention consists in certain novel features of construction and combinations of parts the essential elements of which are set forth in the appended claims and a preferred form of embodiment of which is hereinafter described with reference to the drawings which accompany and form part of this specification.

The specific embodiment of the invention shown in the drawings is illustrative only as the invention is equally applicable to other types of accounting machines. The invention as here shown is applied to a ticket issuing machine intended when in use to be suitably placed so that the tickets issued will be accessible to customers while not to the operator of the machine, thus bringing about a condition which would make noticeable attempts to resell used tickets. For instance the machine may be placed in the window of a ticket office with the front or key side of the machine toward the operator. The receptacle through which tickets are delivered is located at the rear of the machine.

The machine is equipped with a key for each number of tickets that it is designed to issue at one operation of the machine and to operate the machine the operator need only to press one key, the machine then automatically printing and issuing the desired number of tickets, indicating such number and operating an accounting device according to the value of the tickets.

There is an additional manipulative device provided which is not employed at each operation of the machine but serves merely to shift clutches as occasion requires when it is desired to change the operation of the machine so as to issue tickets of a different kind or value. Accordingly the operation of this manipulative device does not enter into regular operations of the machine.

The depression of one of the keys releases a spring actuated segment gear and projects one of a series of pivoted stops into the path of pins on the segment gear to limit its movement. The key is also connected to release an indicator which under spring action rotates toward its zero position but is engaged and returned the desired amount by an element driven by the aforesaid segment gear. The indicator is then latched in its set position after which continued depression of the key effects a closing of a motor controlling switch permitting the motor to return the segment gear to its normal position, the motor later automatically opening its own circuit by returning the switch.

A clutch is provided operable with the switch to connect the segment gear with motor driven mechanism when the circuit is closed and disconnect it when the circuit is opened. By this means the segment gear when driven by its spring is not burdened by mechanism connecting it with the motor.

As is usual in accounting machines the motor is provided with a clutch operating with the switch to permit the motor to gradually stop after the load is disconnected and the circuit opened. United States Patent No. 923,857, issued June 8, 1909, to Charles F. Kettering, and a co-pending application, Serial No. 394,187, filed September 23, 1907, for cash registers, also filed by Charles F. Kettering, show part of the form of motor clutch and motor circuit controlling devices employed in the present invention.

Mechanism driven by the motor operates ticket feeding and printing mechanism and an accounting device to an extent determined by the differential movement of the segment gear.

A third clutch, manually operated, serves to connect the motor driven mechanism with one or the other of two ticket feeding devices and two accounting devices. For instance one of these ticket feeding and one accounting device may be employed for issuing and recording five cent tickets and the other for issuing and recording ten cent tickets. This is the particular arrangement shown in the drawings.

Figures 5, 6, 7, 8, 9:
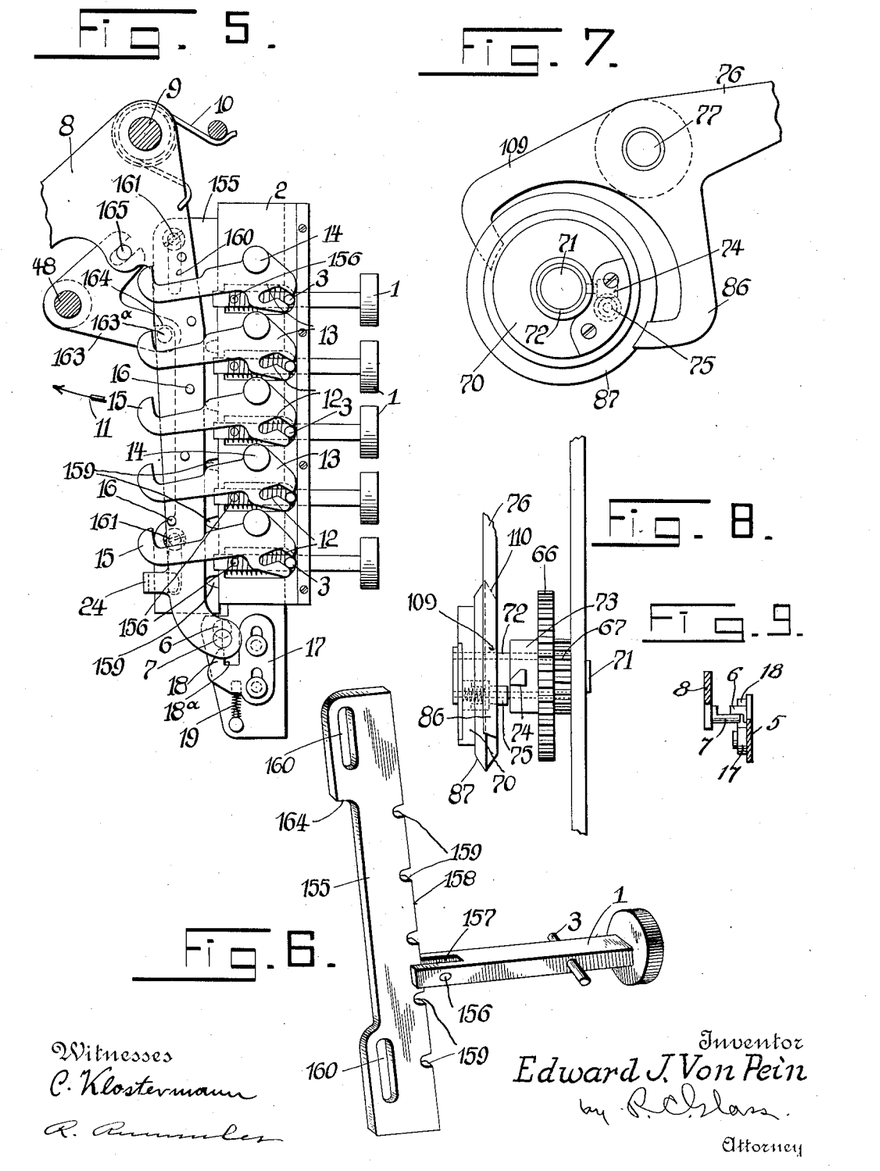
Fig. 5 is a left side elevation of the bank of keys and part of the differential mechanism controlled thereby.
Fig. 6 is a perspective view of a single key and a notched plate which coacts with the key for the purpose of preventing its complete depression and consequent closing of the motor circuit until the differential mechanism comes to rest in its moved position.
Fig. 7 is a detail and left side elevation of a clutch and operating devices therefor, which clutch serves to connect motor driven mechanism with the differential mechanism for the purpose of causing the differential mechanism to be restored to normal position.
Fig. 8 is a front elevation of the device shown in Fig. 7.
Fig. 9 is a detail of the mechanism for latching the main differential element in normal position.

The above description briefly points out the general features of construction of the machine. The details may be seen in the drawings, wherein 1 (Fig. 1) represents keys slidably mounted in a suitable supporting frame 2. Each key is provided with a pin 3 for coacting with an inclined slot 4 in the plate 5 also slidably mounted in the support 2 but transversely to the direction of movement of the keys. The plate 5, as shown in Figs. 5 and 9, is provided with a pin 6 having a flat face on its forward side for coacting with a flat face on the rear side of a pin 7 extending from a segment gear 8, bell crank in form, journaled on a short transverse shaft 9. A spring 10 urges the segment gear 8 to rotate in the direction indicated by arrow 11 (Fig. 5) but pin 6 normally prevents such movement which only occurs when a key is depressed and plate 5 moves upwardly, thus carrying pin 6 out of the path of pin 7. The pins 3 mounted in the shanks of keys 1 extend through the keys and project from the side of the same opposite that at which the plate 5 is located, operating at these ends in slots 12 in detents 13 which are pivoted to frame 2 by pins 14 and have projections 15 for coacting with pins 16 on the segment gear 8. On the depression of a key, before slide 5 moves upwardly far enough to release the segment 8, the corresponding detent 13 is rocked into the path of one of the pins 16, the slot 12 extending abruptly across the path of movement of pin 3, thus causing a quick action of the detent. After the plate 5 has moved upwardly sufficiently to disengage the pins 6 and 7, the segment gear 8 swings rearwardly and upwardly under the force of the spring 10 an extent controlled by the key depressed.

The segment 8 is restored by motor driven mechanism, as hereinafter explained, and is again latched in its normal position on the release of a depressed key when plate 5 drops to its normal position thus carrying pin 6 behind pin 7. In order to insure the retention of segment gear 8 while the plate 5 is moving downwardly this plate is provided with a spring actuated detent plate 17 which is in position to engage pin 7 when the plate 5 is in its upper position. Thus when segment gear 8 is restored, pin 7 engages the inclined nose 18 of plate 17 forcing this plate downward against the action of its spring 19 until pin 7 clears nose 18 when the plate springs upwardly carrying nose 18 to the rear of pin 7. Then when plate 5 lowers under the action of its spring 20 (Fig. 1) pin 6 passes to the rear of pin 7 before plate 17 becomes disengaged from the same. This latching device also serves to prevent repeated operations of the machine by holding the same key depressed as it is necessary to release the depressed key before segment 8 may again be released. To accomplish the desired operation of detent 17 the shoulder 18ª of the detent is slightly offset from the flat surfaces of pins 6 and 7, as shown in Figs. 2 and 5. Thus when detent 17 releases pin 7, pin 7 moves slightly in the direction of arrow 11 coming above nose 18 and therefore simply holding the plate 17 in the position shown, when plate 5 moves upward.

When a key is fully depressed it is latched in its depressed position by latch 21 (Fig. 2) coacting with a shoulder 22 on plate 5. When plate 5 reaches its highest position a spring 23 forces latch 21 beneath shoulder 22 and when segment 8 is returned to its normal position, a lug 24 carried thereby engages arm 25 of latch 21, thus releasing slide 5 and through it, the depressed key.

Figure 1:
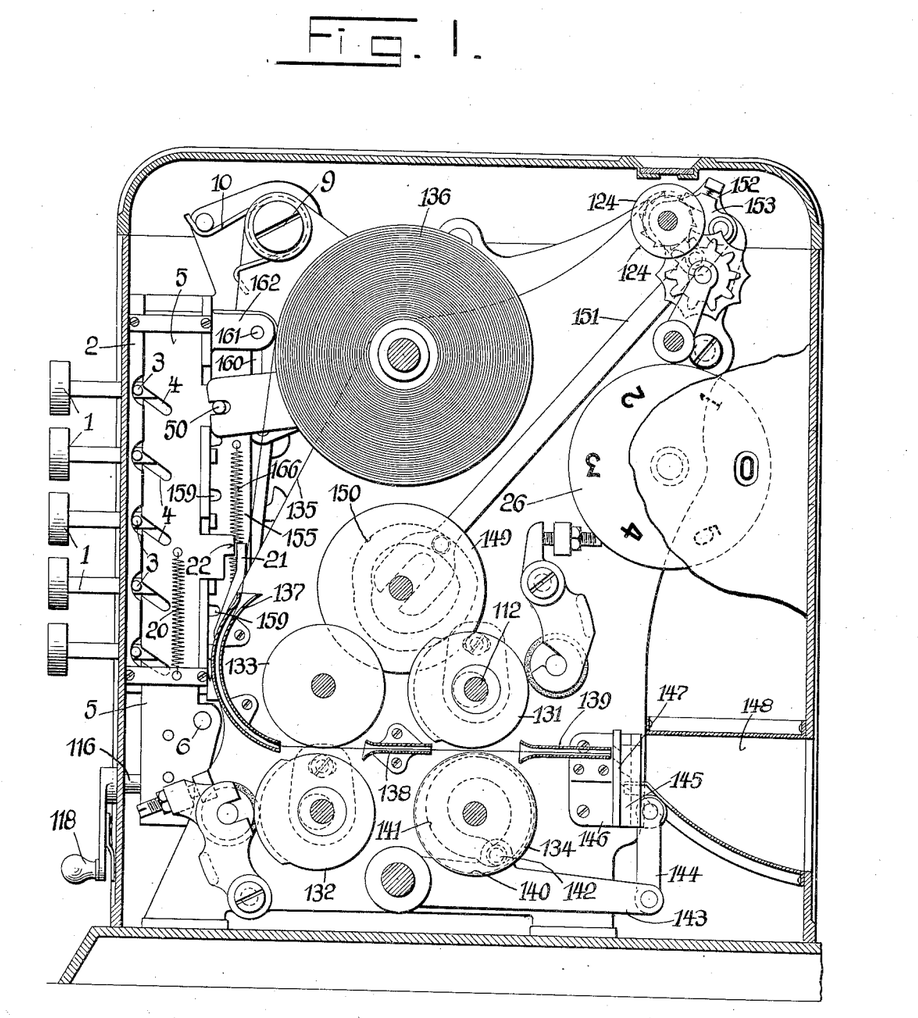
Figure 1 is a vertical longitudinal section of the entire machine taken on line 1—1 of Fig. 3, with gear 128 omitted to more clearly show the position of the cam groove in member 149.
Figure 2:
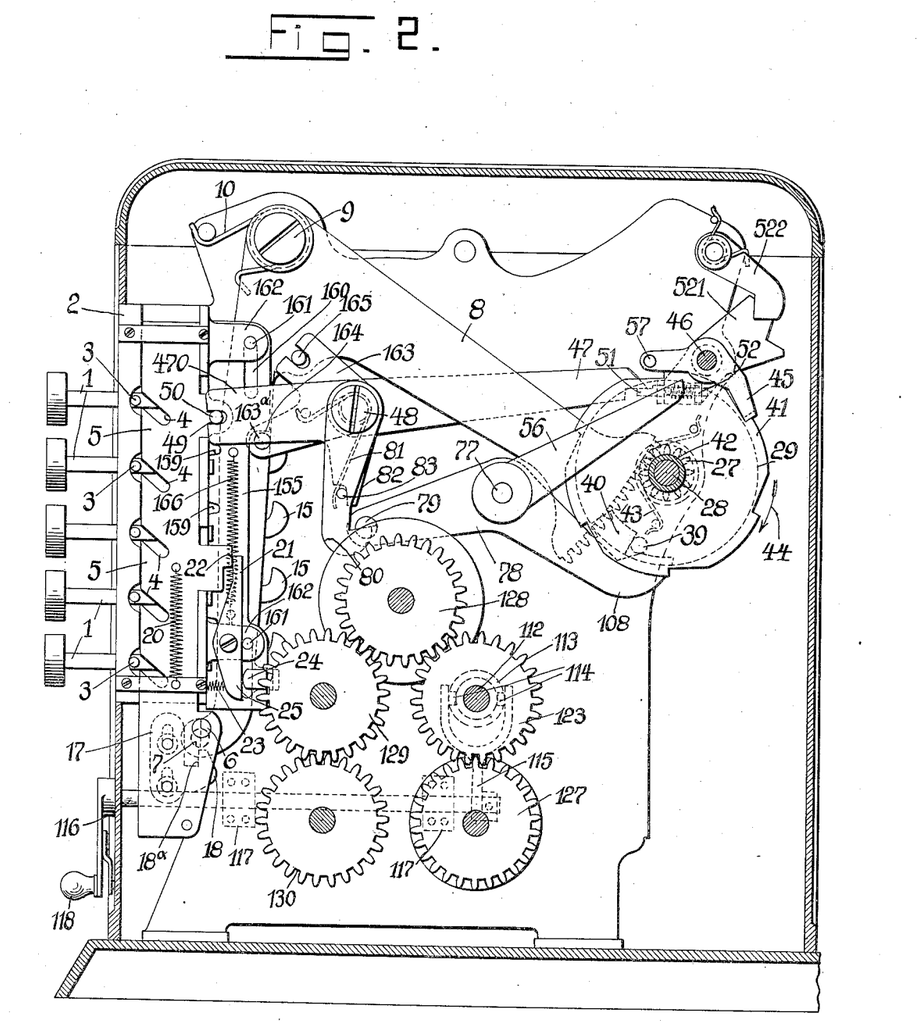
Fig. 2 is another vertical longitudinal section taken on the line 2—2 of Fig. 3.
Figure 3:
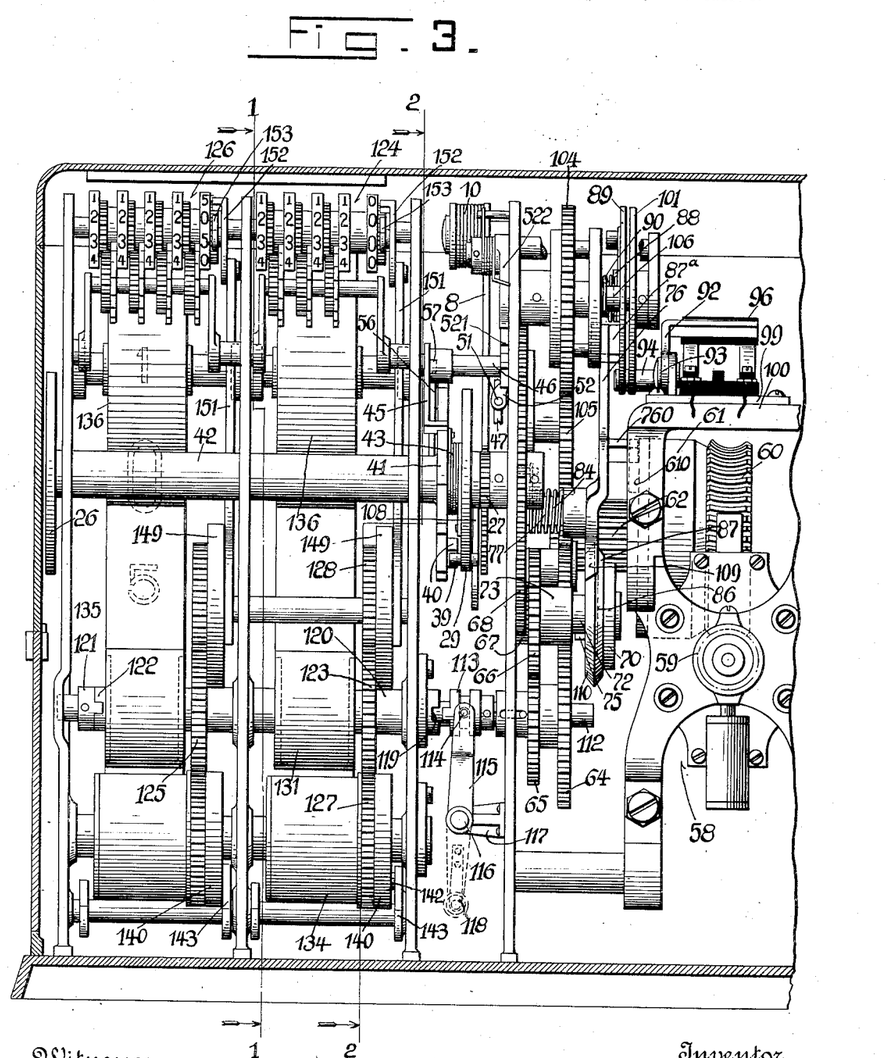
Fig. 3 is a rear elevation with the casing shown in section and the motor partly broken away.

Segment gear 8 is arranged to drive an indicator 26 (Figs. 1 and 3). The indicator is adapted to indicate the particular key that is depressed or the number of tickets issued on any particular operation. Segment gear 8 meshes with a pinion 27 (Fig. 2) on the shaft 28 to which a circular disk 29 is also secured. The disk 29 is provided with a pin 39, which upon the forward rotation of the shaft 28 engages a lug 40 secured to a ratchet wheel 41. The latter, together with indicator 26, is fast on a sleeve 42 surrounding shaft 28. A coil spring 43 encircling shaft 28 is secured at one end to the disk 29 and at its other end to ratchet wheel 41 and normally urges ratchet wheel 41 and disk 29 to rotate in opposite directions, but such movement is prevented by pin 39 contacting with lug 40. When segment gear 8 is differentially rocked by the depression of a key, through the pinion 27 and shaft 28, it rotates disk 29 in the direction indicated by an arrow 44 (Fig. 2). Thus differential movement is communicated to the indicator 26 by pin 39 engaging lug 40 on ratchet wheel 41.

The indicator is retained in its set position by means of a retaining pawl 45 fastened to a short shaft 46 (Figs. 2 and 3). The pawl is held in or out of engagement with the ratchet wheel 41 by means of a spring pressed locking pawl 522 adapted to engage either of two notches in an arm 521 fastened to the shaft 46 carrying the pawl 45. As plate 5 moves upwardly, pawl 45 is disengaged from ratchet 41 by means of an arm 47 pivoted at 48 and immovably connected to a bell crank 470 also pivoted at 48 and provided with a notch 49 through which extends a pin 50 of the detent plate 5. As plate 5 moves upwardly, arm 47 moves downwardly and through contact of the same with the upper side of a spring pressed plunger 51 mounted in a bracket 52 depending from the arm 521 moves said arm and the pawl 46 counterclockwise, thus disengaging the pawl from the ratchet wheel 41. The pawl is returned into engagement with ratchet 41 after the setting of the indicator by the upward movement of an arm 56 engaging pin 57 on pawl 45. Arm 56 is rigid with and is operated by circuit controlling mechanism to be hereinafter described. Due to the fact that plunger 51 is a spring pressed one, arm 47 may be moved to its position above the plunger after the above operation, the beveled upper corner of arm 47 gradually causing the receding of the yielding plunger to permit the passage of the arm.

The motor 58 (Fig. 3) has suitable connections for restoring segment gear 8 and for driving the ticket issuing mechanism.

To this end it is provided with a small spiral gear 59 meshing with a worm wheel 60 which is connected through a suitable clutch 61 with a pinion 62. Rotation of the motor is communicated to shaft 28 through pinion 62 (Fig. 4), intermediate gears 63, 64, 65, 66, pinion 67 and gear 68, fast to shaft 28. The connection between the motor and shaft 28 is normally broken by means of a clutch 70, shown in Figs. 3, 4, 7 and 8. The shaft 71 is surrounded by a sleeve 72 to which pinion 67 is rigidly secured and the clutch 70 is splined. Loosely journaled on sleeve 72 is the gear 66 and this gear is provided with a broad hub 73 having the pin 74 extending from its side. By shifting clutch 70 to the right (Fig. 8) a pin 75 thereon comes into contacting relation with pin 74. Therefore, when the clutch is moved to the right, rotation of gear 66, as driven by the motor, will be communicated to shaft 28 through the clutch 70, sleeve 72 and pinion 67, meshing with gear 68 on shaft 28. The clutch 70 is normally disconnected and is shifted to the right when segment gear 8 and indicator 26 come to rest in their moved positions. The shifting of clutch 70 is accomplished by a lever 76 secured to a shaft 77 and to which is also secured lever 78 (Fig. 2). The latter lever is provided with a pin 79 coacting with a latch 80 loosely pivoted on shaft 48 and urged by a spring 81 into latching position, as shown in Fig. 2. When bell crank 470 is rocked by the action of pin 50, a downward extension 82 of the bell crank engages a pin 83 on latch 80, rocking the latch out of engagement with pin 79 but the latch is not entirely disengaged from pin 79 until the depressed key reaches its innermost position, after the segment 8 has come to rest in its moved position. When lever 78 is released a spring 84 (Fig. 4) coiled around shaft 77 rocks the arm 76 in the direction indicated by an arrow 85, thus causing a bevel extension 86 of arm 76 to engage the beveled surfaces 87 of clutch 70 thereby shifting the clutch into clutching position.

Simultaneously with the shifting of clutch 70 the motor circuit is closed. This is accomplished by the rocking movement of arm 76 which is provided at its upper forward end with a lug 87$^a$ normally in the path of a lug 88 on a disk 89 and preventing rotation of said disk under the action of a coiled spring 90. When lever 76 is rocked by spring 84, thus disengaging lugs 87$^a$ and 88, the disk 89 rotates a slight part of a rotation in the direction indicated by arrow 91, thus forcing an arm 92, pivoted at 93 carrying a roller 94 normally resting in a notch 95 in disk 89 downwardly. The arm 92 carries a block of insulating material 96 extending across the upper surfaces of contact pieces 97. Therefore when arm 92 is rocked downwardly the contacts 97 are forced into engagement with stationary contacts 98 secured to a plate 99 fastened to the motor frame 100. The contacts 97 serve for properly connecting the motor circuits with a line circuit and are held in contacting position during the desired length of time by disk 89 and a disk 101 operating in connection with disk 89. Disk 101 is fast to a shaft 102 and is provided with a notch 103 normally registering with notch 95 and the periphery of disk 101 also bears against roller 94. When disk 89 is rotated by spring 90 it carries notch 95 out of register with the notch 103, thus the disks 89 and 101 in combination present an uninterrupted circular surface to roller 94 and consequently the motor circuit cannot be opened until the normal relation between disks 89 and 101 is restored. Shaft 102 carries rigidly a gear 104 meshing with an intermediate gear 105 in turn meshing with pinion 62 driven by the motor, as before explained. By having shaft 102 rotatably driven, means are provided for tensioning spring 90 at the ends of operations of the machine merely by returning lug 87ᵃ into the path of lug 88 on disk 89. Disk 89 is connected to disk 101 by a pin 106 carried by one of the disks extending through a slot 107 in the other disk. The slot and pin connection permits of the required relative movement between disks 89 and 101 to close the switch and also provides means for communicating rotation from disk 101 to disk 89 to maintain them in their altered relation. A cam 107 fast to gear 105 serves to rock an arm 171 forward at each rotation of arm 175, thus tensioning a spring 172 so that at the end of an operation a roller 173 on the arm bears against the surface 174 of cam 170, thereby assisting the shaft 102 to complete its work of tensioning spring 90.

The motor clutch 61 is described in the previously mentioned Patent No. 923,857, and its object is to disconnect the motor from the driving mechanism when the driving mechanism has completed its operation. The clutch 61 is spring actuated, that is, the elements thereof are operatively connected by means of springs but they are normally held in disconnected relationship by a lug 760 on arm 76, which lug is in the path of lug 610 on a member of the clutch. When arm 76 is rocked by a spring 84 the lug 760 passes out of the path of lug 610, thus permitting the springs to operatively connect the members of the clutch and when arm 76 is returned, lug 760 again comes into the path of lug 610, thereby disconnecting the elements of the clutch, and causing the disconnection of the motor from the driving mechanism.

Figure 4:
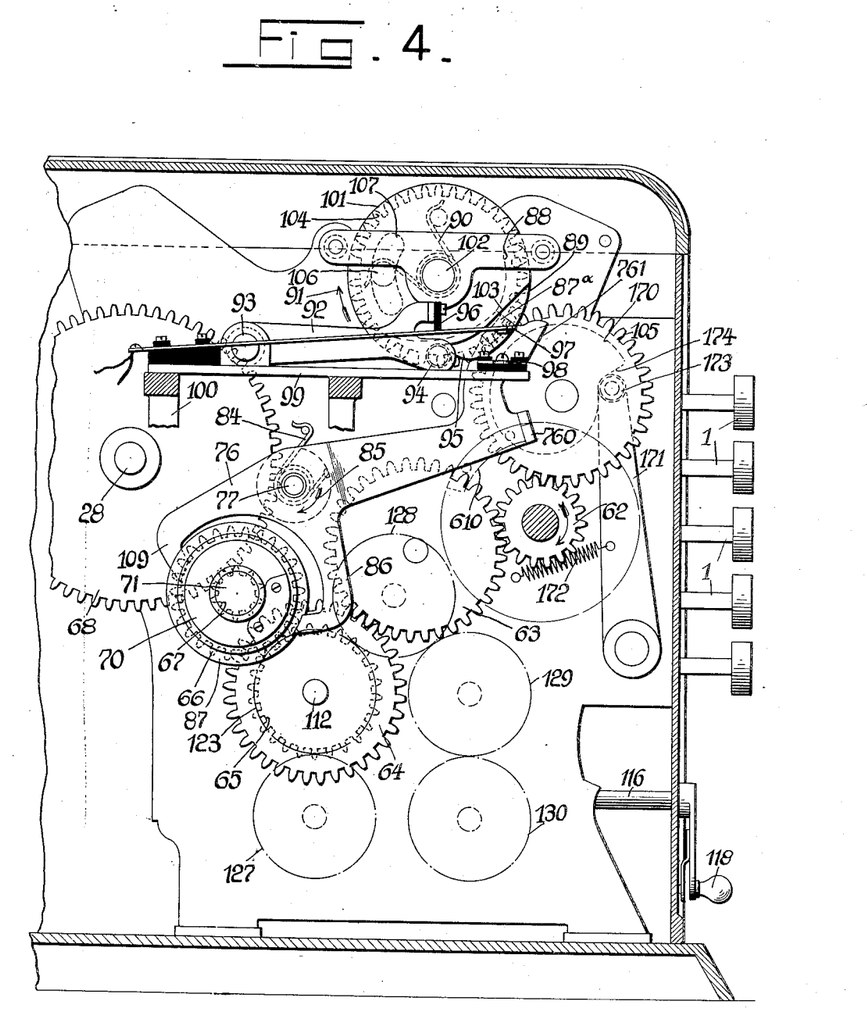
Fig. 4 is a left side elevation showing the connection between the driving mechanism of the motor and the motor switch and coacting devices.

Rotation of shaft 28 by its gear connection with the motor causes the segment gear 8 to return to normal position. When the segment gear arrives in its normal position, disk 29, which is also fast to shaft 28, arrives at its normal position at which time the pin 39 carried by disk 29 engages the rearward arm 108 of the lever 78, thereby rocking the shaft 77 oppositely to the direction indicated by the arrow 85 (Fig. 4). At this time arm 109 of lever 76 engages the inclined surface 110 of the clutch 70 (Fig. 8) thereby disengaging the clutch from its connection to segment gear 8. Also the rocking of arm 76 carries lug 87ᵃ back into the path of lug 88 on the disk 89, consequently further rotation of disk 89 is prevented but as shaft 102 continues to rotate a slight distance, spring 90 is again tensioned. When the desired tension on spring 90 is obtained, notch 103 in disk 101 comes into register with notch 95 in disk 89 and consequently the switch arm 92 is permitted to return to normal position and the contacts 97 and 98 are separated.

The intermediate gears 64 and 65 are secured to a shaft 112 by which the differential rotation of the gears is communicated to one or the other of two check printing and issuing mechanisms and to one or the other of two accounting devices. Connection of shaft 112 to these devices is controlled by a clutch 113 (Fig. 3). The clutch 113 is secured to shaft 112 and is provided with an annular groove into which extend pins 114 on an arm 115 fast to a shaft 116 journaled in brackets 117. The shaft 116 is provided with a crank handle 118 and by means of this handle the shaft is manually rocked so that through the clutch member 113 shaft 112 may be shifted to carry clutch 113 into engagement with notches 119 on a sleeve 120 and a clutching device 121 also fast to the shaft 112 out of engagement with notches in a sleeve 122, also surrounding shaft 112. With crank handle 118 in the position shown in Fig. 3, shaft 112 is operatively connected with sleeves 122 through the clutch member 121 and is disconnected from sleeve 120 as clutch 113 is not in engaging position. Sleeve 120 carries a gear 123 for driving the printing mechanism for issuing ten cent tickets and also for driving the corresponding accounting device 124. Sleeve 122 is provided with a gear 125 for driving the five cent ticket printing mechanism and the corresponding accounting device 126. As shown in Figs. 2 and 3, gear 123 meshes with a gear 127 and also with a gear 128 which in turn meshes with a gear 129 in turn meshing with a gear 130. The gears 123 and 130 are rigid with electrotype rollers 131 and 132 (Fig. 1) and the gears 129 and 127 are rigid with suitable coacting impression rollers 133 and 134. A paper strip 135 coming from a supply roller 136 and passing through guides 137, 138, and 139, passes between the two sets of impression rollers and electrotype rollers, thus receiving impressions on both faces. The electrotype rollers and impression rollers being geared to shaft 28 are rotated a number of times corresponding to the extent of movement of segment gear 8 and by this means they are caused to print upon and issue the desired number of tickets. A disk 140 is rigid with gear 127 and is provided with an eccentric groove 141 into which extends a roller 142 on a knife operating arm 143. This arm 143 is rocked upwardly for each complete rotation of gear 127, a complete rotation being required to issue a single ticket. Arm 143 is connected by a link 144 to a knife 145 which is slidably mounted in a guide 146 provided with a suitable coacting fixed knife edge 147. The tickets severed from the strip drop into the receptacle 148 from which they may be removed by purchasers. The gear 128 is rigid with a disk 149 having a cam groove 150 suitable for reciprocating a pitman 151 (Fig. 1) connected at its upper end to a pivoted frame 152 carrying an actuating pawl 153 for the accounting device 124. Thus for each rotation of gear 128 the accounting device 124 will be advanced one unit of movement, each unit corresponding in value to ten cents. To simplify the construction, the tens and units wheels are secured together to be jointly rotatable, the units wheels being provided with a series of ciphers while the tens wheels are provided with the usual digits, cipher to nine. Carrying operations from wheels of lower order to wheels of higher order are accomplished by the well known Geneva stop transfer mechanism, as indicated in Fig. 1.

In the five cent ticket printing mechanism cam 140 and ticket cutting mechanism, and cam disk 149 and pitman 151 are duplicated and will therefore not require a separate description. In the five cent accounting device 126 the wheel of the lowest order only is actuated directly by the actuating pawl. The wheel is provided with alternate ciphers and fives and is arranged to transfer to the wheel of next higher order at each second unit of movement, the wheels of higher order transferring after each complete rotation.

In order to prevent the closing of the motor switch before segment gear 8 comes to rest in the position to which it is intended to be moved by the depression of a key, means are provided operable with segment 8 which prevent the complete depression of a key until segment 8 comes to rest in its moved position. As before explained, the keys serve first to differentially control the movement of segment gear 8 and then to close the motor switch. If it were possible to close the motor switch before segment 8 comes to rest fewer tickets would be issued and the indication of a lesser amount than intended would result. The latch 80 is rocked clear of pin 79 during the final part of movement of a depressed key. In order to prevent this final movement of a key until segment 8 comes to rest a notched plate 155 is provided for coacting with pins 156 extending across slots 157 in the shanks of keys 1. The pins 156 are normally at some distance away from the forward edge of plate 155, and therefore would not contact with plate 155 until the key nears its innermost position but to complete the depression of a key, it is essential that one of notches 159 in plate 155 be in the path of movement of the pin 157. Plate 155 is provided with slots 160 through which extend fixed pins 161 carried by ears 162 on the frame 2. A bell crank lever 163 pivoted on pin 48 has a pin 163ª extending across the lower edge of a shoulder 164 on plate 155. The other end of the bell crank lever is slotted to receive a pin 165 extending from the side of segment 8, and accordingly the bell crank lever is rocked and the plate 155 elevated in correspondence to the differential movement of segment 8. The notches 159 in plate 155 are differentially located with respect to the coacting pins 156 on the keys, so that when segment 8 is moved a distance corresponding to the key depressed, the corresponding notch 159 will be opposite the respective pin 156 of the depressed key. Consequently the complete depression of a key cannot take place until the segment 8 is moved the required differential amount. By this means a successive operation of the indicator and of the ticket printing or the accounting mechanism is compelled. When the keys are released a spring 166 returns plate 155 to its lower position.

Operation: The complete operation of the machine is effected by a mere depressing of one of the keys 1, the particular key depressed determining the extent of movement of the differential mechanism and consequently setting of the indicator, printing and issuing of the tickets and the actuation of the accounting device. When a key is depressed its pin 3 rocks one of the detents 13 into the path of movement of one of pins 16 on the segment gear 8. While the pin 3 of the depressed key is engaging the detent 13 the pin also enters one of the slots 4 in plate 5, thus lifting the plate so that its pin 6 is carried clear of pin 7 on segment 8. The segment then rocks rearward under the action of spring 10 until stopped by the moved detent 13.

The indicator 26 is released by the upward movement of plate 5 through pin 50, lever 470 and arm 47, the latter engaging plunger 51 and rocking the pawl 45 out of engagement with ratchet wheel 41, thereby permitting the spring 43 to rotate said wheel, and the indicator toward zero position. Before the indicator arrives at its zero position, lug 40 on ratchet wheel 41 is engaged by a pin 39 on disk 29 and is differentially set in accordance with the degree of rotation accorded to the disk by segment 8. The pawl 45 is returned into latching engagement with ratchet 41 by arm 56 fast to shaft 77. This shaft is permitted to rock under spring action when plate 5 reaches its upper position after the indicator is set.

The differential movement of segment gear 8, through the bell crank lever 163, lifts plate 155 (Fig. 6) so that one of the notches 159 arrives opposite pin 156 of the depressed key when the segment gear comes to rest. The continued depression of the key through lever 470 and extension 82 thereof causes latch 80 to be disconnected from pin 79 on lever 78. Lever 78, together with shaft 77 and lever 76 secured thereto then rotate in the direction indicated by arrow 85 (Fig. 4) until shoulder 761 of arm 76 engages a fixed stop. This movement of lever 76 releases spring-operated clutch 61, thus connecting the motor with pinion 62 and also shifts clutch 70 so that shaft 28 is geared directly to the motor armature. Also as lug 87ª is carried clear of the lug 88 on spring pressed disk 89, this disk is permitted to rotate and force arm 92 downwardly and thereby force contacts 97 into engagement with contacts 98. As the intermediate gearing between shaft 28 and the motor includes the driving devices for the ticket printing and issuing mechanism and the accounting devices, these devices will be operated the required amounts. The extent of rotation of shaft 28 is regulated by the return movement of segment gear 8, and when it arrives in its normal position, a pin 39 on disk 29 fast to shaft 28 engages the rear extension 108 of lever 78 forcing the lever to its normal position and also lever 76 to its normal position, the two levers being fast on shaft 77. The returning of lever 76 effects the return movement of clutch 70 and also as its lug 87ª is carried into the path of the lug 88 on disk 89, the motor circuit is opened as disk 89 is held in its normal position until the notch 103 on disk 101 registers with the notch 95 in disk 89. The switch controlling arm 92 is then free to rock upwardly, permitting the switch to open.

The mechanism is normally connected to drive only one of the ticket issuing and printing devices through one of the clutches 113 or 121 (Fig. 3). If it is desired to change from one ticket issuing device to another, this may be done by operating crank handle 118, thus shifting shaft 112 and reversing the relation of the clutches.

While the form of mechanism herein shown and described is admirably adapted to fulfil the objects primarily stated, it is to be understood that it is not intended to confine the invention to the one form of embodiment herein described but that it is susceptible of embodiment in various forms all coming within the scope of the claims which follow.

The term "accounting device" in the claims, refers broadly to any one of various accounting devices, such as indicators, totalizers, etc., common to accounting machines.

What is claimed is:

1. In a machine of the class described, the combination with a roller carrying a supply of ticket strip, of feeding devices differentially operable to draw one or more tickets from said supply roller, a differentially adjustable element having an invariable starting point, manipulatively controlled means for differentially adjusting said element to predetermine the number of tickets to be issued, variably operable means for restoring said element to its starting point, the extents of said variable operations being controlled by the differentially adjustable element, and connections whereby the variable operation of the restoring means will differentially actuate the aforesaid feeding devices and thereby issue the predetermined number of tickets.

2. In a machine of the class described, the combination with a ticket issuing mechanism, of an operating means therefor, a series of manipulative devices for determining whether one or more tickets are to be issued by the ticket issuing mechanism, and means controlled by the manipulative devices for indicating the number of tickets issued at each operation of the machine.

3. In a machine of the class described, the combination with a roller carrying a supply of ticket strip, of feeding devices differentially operable to draw one or more tickets from said supply, a differentially adjustable element having an invariable starting point, manipulatively controlled means for differentially adjusting said element to predetermine the number of tickets to be issued, means for restoring said element to its starting point, and connections whereby operation of the restoring means will drive the aforesaid feeding devices to feed the predetermined number of tickets.

4. In an accounting machine, the combination with an accounting device, mechanism for differentially operating the accounting device, a motor, a clutch connecting said motor with said mechanism, and a manipulative device for controlling the clutch adapted to disconnect the same after a period of operation of the motor determined by the manipulative device.

5. In an accounting machine, the combination with an accounting device, mechanism for operating said accounting device, a motor for driving said mechanism, a motor circuit, a switch for said circuit, a manipulative device for controlling said mechanism and closing said switch, and a member movable with said manipulative device constructed to prevent said manipulative device from closing said switch until said manipulative device has completed its manipulative operation.

6. In a machine of the class described, the combination with a ticket issuing mechanism, of an operating means therefor, means for indicating the number of tickets issued by the ticket issuing mechanism at each operation of the machine, mechanism for registering the value of tickets issued, and a series of keys for determining whether one or more tickets are to be issued and also for controlling the indicating means and the registering mechanism.

7. In a machine of the class described, the combination with a ticket issuing mechanism, of an electric motor therefor constructed to be variably operated for the purpose of issuing one or more tickets, and a series of keys for determining the length of operation of the motor.

8. In an accounting machine, the combination with an accounting device, of differential mechanism, a spring for operating the differential mechanism, a motor for tensioning said spring, and manipulative devices constructed to successively control said differential mechanism and the operation of said motor.

9. In an accounting machine, the combination with an accounting device, differential mechanism for operating the accounting device, a latch for holding the differential mechanism in its normal position, depressible keys for releasing and controlling said differential mechanism, automatic means for restoring the differential mechanism, and a second latch operable to retain the differential mechanism when restored until the depressed key is released.

10. In an accounting machine, the combination with an accounting device, a series of keys, means for differentially operating the accounting device controlled by the keys, a ticket delivering device, means for differentially operating the ticket delivering device controlled by the keys, and connections whereby the keys cannot control the ticket delivering device until the accounting device is operated.

11. In an accounting machine, the combination with an accounting device, of a series of keys, means for differentially operating the accounting device controlled by the keys, a ticket delivering device, means for operating the ticket delivering device controlled by the keys, and connections whereby the keys are compelled to control the accounting device before they control the ticket delivering device.

12. In a ticket issuing machine, the combination with a plurality of ticket issuing mechanisms, of driving mechanism therefor, a manipulative device having connections for determining which of said ticket issuing mechanisms may be operated, and a second manipulative device having connections for determining the extent of operation of a selected issuing mechanism.

13. In an accounting machine, the combination with a rotatable indicator, a spring for rotating the indicator toward zero position, and means for differentially rotating the indicator when moved in one direction and having connections for winding said spring when moved in the opposite direction.

14. In an accounting machine, the combination with an accounting device; of ticket issuing mechanism; an indicator; differential mechanism for driving the accounting device, indicator, and ticket issuing mechanism; said differential mechanism constructed to cause the accounting device to total values of issued tickets while the indicator is caused to indicate their number at each operation; and manipulative devices for controlling said differential mechanism.

15. In a machine of the class described, the combination with a ticket issuing mechanism, of a motor therefor constructed to be variably operated for the purpose of issuing one or more tickets, means for indicating the number of tickets issued at each operation of the machine, and a series of keys for determining the length of operation of the motor and for controlling the indicating mechanism.

16. In a machine of the class described, the combination with a ticket issuing mechanism, of a motor therefor constructed to be variably operated for the purpose of issuing one or more tickets, means for indicating the number of tickets issued at each operation of the machine, a differentially movable member for operating said indicating means, and a series of keys for controlling the length of operation of the motor and also for controlling the movement of the differential member.

17. In an accounting machine, the combination of a plurality of ticket issuing mechanisms, a plurality of respective accounting mechanisms therefor designed to indicate different amounts upon the issuing of the same number of tickets by the ticket issuing mechanisms, operating mechanism for the above mechanisms, means for operatively connecting either of the ticket issuing mechanisms and its corresponding accounting mechanism to the operating mechanism, and a manipulative device for controlling the extent of operation of the operating mechanism and its operatively connected ticket issuing and accounting mechanisms.

18. In an accounting machine, the combination of a ticket issuing mechanism, driving mechanism therefor adapted to be differentially operated, a plurality of accounting mechanisms adapted to indicate different amounts upon the issuing of the same number of tickets by the ticket issuing mechanism, means for operatively connecting either of said accounting mechanisms with the driving mechanism, and mechanism for differentially operating the driving mechanism and thereby the ticket issuing and connected accounting device.

19. In an accounting machine, the combination of a ticket issuing device and indicator for indicating the number of tickets to be issued, mechanism for driving the indicator and the ticket issuing mechanism, means for differentially operating said driving mechanism and a value accounting device operated through the driving mechanism adapted for counting multiples of the number shown on the indicator.

20. In a machine of the class described, the combination with a ticket issuing mechanism, of an electric motor therefor constructed to be variably operated for the purpose of issuing one or more tickets, mechanism controlled by the ticket issuing mechanism for registering the number of tickets issued, and a series of keys for determining the number of tickets to be issued.

21. In a machine of the class described, the combination with a plurality of ticket issuing mechanisms, of an operating mechanism common thereto, and adapted to cause any one of the ticket issuing mechanisms to issue one or more tickets at a single operation of the machine, and means for coupling the latter with any one of the ticket issuing mechanisms and means independent of said first mentioned means for determining the number of tickets to be issued.

22. In a machine of the class described, the combination with a plurality of ticket issuing mechanisms, of an operating mechanism common thereto and constructed to be variably operated for the purpose of causing the ticket issuing mechanism to which it is connected to issue one or more tickets, means for coupling the operating mechanism with any one of the ticket issuing mechanisms, and means for determining the number of tickets to be issued.

23. In a machine of the class described, the combination with a plurality of ticket issuing mechanisms, of an operating mechanism common thereto and constructed to be variably operated for the purpose of causing the ticket issuing mechanism to which it is connected to issue one or more tickets, means for connecting the operating mechanism with any one of the ticket issuing mechanisms, manipulative devices for determining the number of tickets to be issued, and means controlled by said devices for indicating the number of tickets issued.

24. In a machine of the class described, the combination with a plurality of ticket issuing mechanisms, of a variably operating mechanism common thereto, means for coupling the latter with any one of the ticket issuing mechanisms and constructed to be coupled only to the selected ticket issuing mechanism, and a plurality of registering devices corresponding in number to the ticket issuing mechanisms and controlled by the latter.

25. In a machine of the class described, the combination with a plurality of ticket issuing mechanisms, of a corresponding number of registering devices, each of which is controlled by a companion ticket issuing mechanism, an operating mechanism common to the ticket issuing mechanisms and constructed to be variably operated for the purpose of causing the ticket issuing mechanism to which it is connected to issue one or more tickets, means for connecting the operating mechanism with any one of the ticket issuing mechanisms, and means for determining the number of tickets to be issued.

26. In a machine of the class described, the combination with a ticket issuing mechanism, of an electric motor for operating said mechanism and having a variable period of operation for the purpose of causing the ticket issuing mechanism to issue one or more tickets, a circuit for said motor, and manipulative devices for closing said circuit and for determining the number of tickets to be issued.

27. In a machine of the class described, the combination with a ticket issuing mechanism, of an electric motor for operating said mechanism and having a variable period of operation for the purpose of causing the ticket issuing mechanism to issue one or more tickets, a circuit for said motor, means for indicating the number of tickets issued, and manipulative devices for closing said circuit for determining the number of tickets to be issued and controlling the indicating means.

28. In a machine of the class described, the combination with two ticket issuing mechanisms each including a gear, of an operating mechanism including a longitudinally movable shaft, two gears loosely mounted on said shaft and constantly in engagement with the gears first mentioned, a clutch element secured to the shaft for each of the loose gears thereon, means for longitudinally moving the shaft in either direction to clutch the desired loose gear to the shaft, and means for variably rotating the shaft to differentially drive the connected ticket issuing mechanism.

29. In a machine of the class described, the combination with a registering mechanism, of an electric motor for controlling the operation thereof, a circuit for said motor, manipulative devices for maintaining the circuit closed continuously for different periods of time for the purpose of imparting a differential movement to the registering mechanism, and means controlled by the manipulative devices for temporarily indicating until the next operation of the machine the extent of movement last imparted to the registering mechanism.

30. In a machine of the class described, the combination with a plurality of registering mechanisms, of a variably driven electric motor common to said mechanisms, a circuit for said motor, means for connecting the motor with any one of the registering mechanisms, and manipulative devices for maintaining the circuit through the motor closed continuously for different periods of time for the purpose of imparting a differential movement to the registering mechanism connected to the motor.

31. In a machine of the class described, the combination with a ticket issuing mechanism, of an electric motor therefor constructed to be variably operated for the purpose of issuing one or more tickets, means for indicating the number of tickets issued, and a series of keys for determining the length of operation of the motor and for controlling the indicating mechanism.

32. In a machine of the class described, the combination with a ticket issuing mechanism, of an electric motor therefor constructed to be variably operated for the purpose of issuing one or more tickets, means for indicating the number of tickets issued, a differentially movable member for operating said indicating means, and a series of keys for controlling the length of operation of the motor and also for controlling the movement of the differential member.

33. In a machine of the class described, the combination with a plurality of ticket issuing mechanisms, of an operating mechanism constructed to cause the ticket issuing mechanism with which it is connected to issue one or more tickets, manipulative means for connecting the operating mechanism with any one of the ticket issuing mechanisms, manipulative means independent of said first mentioned manipulative means for determining the number of tickets to be issued, and means controlled by said last mentioned manipulative means for indicating the number of tickets issued.

34. In a machine of the class described, the combination with a plurality of ticket issuing mechanisms, of a corresponding number of registering mechanisms each of which is controlled by a companion ticket issuing mechanism, an operating mechanism constructed to cause the ticket issuing mechanism to which it is connected to issue one or more tickets, means for connecting the operating mechanism with any one of the ticket issuing mechanisms, and means for determining independently of said coupling means the number of tickets to be issued.

35. In a machine of the class described, the combination with a rotatable indicator, of a spring for rotating the indicator toward zero position, means for differentially rotating the indicator when moved in one direction and having connections for winding said spring when moved in the opposite direction, a latch for latching said indicator in its adjusted position while the spring is being wound, and means for releasing said latch at the beginning of the next operation of the machine to permit the spring to return the indicator to zero position.

36. In a machine of the class described, the combination with a rotatable indicator, of a spring for rotating the indicator toward zero position, means for differentially rotating the indicator when moved in one direction and having connections for winding the spring when moved in the opposite direction, a latch for holding said indicator in its adjusted position, a pawl for holding the latch out of latching position, means for moving the latch into latching position after the indicator has been adjusted, and means for moving said latch out of latching position at the beginning of the next operation of the machine to permit the spring to return the indicator to zero position.

37. In a machine of the class described, the combination with a rotatable indicator, of a rotatable member having a normal position, connections between said member and the indicator, a spring normally maintaining the connections in connecting relationship, differential mechanism for rotating the rotatable member the connections serving to cause the indicator to move the same extent, and a latch for retaining the indicator in adjusted position against the action of said spring while the rotatable member is being returned to normal position.

38. In a machine of the class described, the combination with rotatable indicators, of a rotatable member, connections between said member and the indicator, a spring normally maintaining the connections in connecting relationship, differential mechanism for rotating the rotatable member, the connections serving to cause the indicator to move the same extent, a latch for retaining the indicator in adjusted position against the action of said spring while the rotatable member is being returned to normal position, and means for rendering said latch ineffective at the next operation of the machine to permit the spring to return the indicator to normal position before the rotatable member is again adjusted by the differential mechanism.

39. In a machine of the class described, the combination with a rotary indicator, of a ratchet rigid therewith and having a projection, a disk pivoted concentrically with said indicator and beside said ratchet and having a projection normally engaging said projection on the ratchet, a spring tending to rotate said disk and ratchet in opposite directions and normally maintaining the engagement of the projection on the disk with the projection on the ratchet, differential mechanism for rotating said disk the engagement of the projections on the ratchet and disk serving to move also the disk and having a projection normally engaging said ratchet to prevent return movement of said indicator, when the disk is returned to normal position against the action of said spring by the differential mechanism.

40. In a machine of the class described, the combination with a rotary indicator, of a ratchet rigid therewith and having a projection, a disk pivoted concentrically with said indicator and beside said ratchet and having a projection normally engaging said projection on the ratchet, a spring tending to rotate said disk and ratchet in opposite directions and normally maintaining the engagement of the projection on the disk with the projection on the ratchet, differential mechanism for rotating said disk the engagement of the projections on the ratchet and disk serving to move also the disk and the indicator, a pawl for engaging said ratchet to prevent return movement of said indicator when the disk is being returned to normal position against the action of said spring by the differential mechanism, and means for releasing said pawl to permit the spring to return the indicator to normal position.

41. In a machine of the class described, the combination of an operating mechanism adapted to operate through one or more cycles at an operation of the machine, of a bank of keys, a differentially movable member, spring means for actuating the same in one direction, elements under the control of said keys for determining the extent of movement of said member imparted thereto by said spring means, means whereby said member is given an invariable extent of movement in the reverse direction upon each cycle of movement of the operating mechanism of the machine the extent of movement of said member in the first direction determining the number of cycles of movement of the operating mechanism.

42. In a machine of the class described, the combination with a ticket issuing mechanism adapted to issue one or more tickets at a single operation of the machine, of operating means including a motor with a locking arm therefor, a differentially movable device for determining the number of tickets to be issued and for controlling the movement of the locking arm out of locking engagement with the motor, and manipulative means for determining the extent of movement of said differentially movable device to normal position and the locking arm to locking position when the desired number of tickets has been issued.

43. In a machine of the class described, the combination with a ticket supply roll, of mechanism for printing and severing tickets therefrom, operating mechanism comprising an electric motor constructed to be variably operated for the purpose of causing the ticket issuing mechanism to print and sever one or more tickets at an operation of the machine and including a locking arm normally locking the motor from operation, a differentially movable member controlling the variable operation of said motor the member being given the same number of steps of movement as the number of tickets to be issued, and manipulative means for determining the extent of movement of said member and controlling the movement of said locking arm the operating mechanism being constructed to return the differentially movable member one step toward normal position as each ticket is issued and finally cause the locking arm to move into locking position when the last ticket has been issued.

44. In a machine of the class described, the combination with an operating mechanism adapted to operate through one or more cycles at an operation of the machine, of a bank of keys, a spring actuated member, means controlled by the keys for determining the extent of movement of said member in one direction, means whereby said member is given an invariable extent of movement in the reverse direction upon each cycle of movement of the operating mechanism of the machine, the extent of movement of said member in the first direction determining the number of cycles of movement of the operating mechanism.

45. In a machine of the class described, the combination with a ticket supply roll, of mechanism for printing and severing tickets therefrom, a motor constructed to be variably operable for the purpose of causing the mechanism to print and sever one or more tickets at an operation of the machine, and manipulative means for determining the extent of operation of the motor.

46. In a machine of the class described, the combination with a member to be differentially positioned, of manipulative devices, means for differentially positioning said member under the control of the manipulative devices, a ticket supply roll, mechanism for printing and severing tickets from said roll, and operating means for said mechanism adapted to actuate the same to print and sever a number of tickets corresponding to the differential position of the aforesaid member.

47. In a machine of the class described, the combination with a ticket supply roll, of mechanism for printing and severing tickets therefrom, operating means adapted to be variably operated to actuate said mechanism to print and sever one or more tickets at an operation of the machine, a series of keys, and means controlled by the keys for determining the extent of movement of the operating means.

48. In a machine of the class described, the combination with a plurality of ticket issuing mechanisms each differentially operable to feed one or more tickets as desired, of a variably rotatable shaft, means for variably rotating said shaft, and means for selectively connecting the ticket issuing mechanisms to said shaft whereby to effect differential operation of the selected mechanism.

49. In a machine of the class described, the combination with a plurality of ticket feeding mechanisms each differentially operable to feed one or more tickets, of a variably rotatable shaft, means for variably rotating said shaft, and manipulative means for connecting the desired ticket feeding mechanism to said shaft whereby to effect differential operation of said mechanism.

50. In a machine of the class described, the combination with two ticket issuing mechanisms each differentially operable to feed one or more tickets as desired, a longitudinally movable and variably rotatable shaft, a clutch element carried by said shaft for each ticket issuing mechanism, means for shifting the shaft longitudinally in either direction to clutch either of the issuing mechanisms to said shaft, and means for variably rotating the shaft whereby to effect differential operation of the ticket issuing mechanism clutched thereto.

In testimony whereof I affix my signature in the presence of two witnesses.

EDWARD J. VON PEIN.

Witnesses:
R. C. GLASS,
CARL W. BEUST.

---

It is hereby certified that in Letters Patent No. 1,186,626, granted June 13, 1916, upon the application of Edward J. Von Pein, of Dayton, Ohio, for an improvement in "Ticket Issuing and Accounting Machines," errors appear in the printed specification requiring correction as follows: Page 3, line 51, after the word "ratchet" insert the word *wheel;* page 4, line 37, for the reference-numeral "107" read *170;* page 5, line 77, after the word "edge" insert the reference-numeral *158;* page 10, line 19, claim 39, for the words "having a projection normally" read *the indicator, and a pawl for;* and that the said Letters Patent should be read with these corrections therein that the same may conform to the record of the case in the Patent Office.

Signed and sealed this 22d day of August, A. D., 1916.

[SEAL.]

F. W. H. CLAY,
*Acting Commissioner of Patents.*

Cl. 235—3.